US009020507B2

United States Patent
Warken et al.

(10) Patent No.: US 9,020,507 B2
(45) Date of Patent: Apr. 28, 2015

(54) RADIO ACCESS TECHNOLOGY MULTIPLEXING

(75) Inventors: Markus Warken, Laupheim (DE); Jochen Wessel, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 590 days.

(21) Appl. No.: 13/262,975

(22) PCT Filed: Apr. 6, 2009

(86) PCT No.: PCT/EP2009/054062
§ 371 (c)(1),
(2), (4) Date: Oct. 5, 2011

(87) PCT Pub. No.: WO2010/115449
PCT Pub. Date: Oct. 14, 2010

(65) Prior Publication Data
US 2012/0034881 A1 Feb. 9, 2012

(51) Int. Cl.
*H04W 88/10* (2009.01)
*H04W 8/26* (2009.01)
*H04W 36/00* (2009.01)

(52) U.S. Cl.
CPC ............... *H04W 88/10* (2013.01); *H04W 8/26* (2013.01); *H04W 36/0083* (2013.01)

(58) Field of Classification Search
USPC .......... 455/68, 426.1, 436, 552.1, 432.1, 442, 455/414.3, 67.11, 556.1; 370/329, 328, 370/252, 331, 241, 254, 315, 280
See application file for complete search history.

(56) References Cited

U.S. PATENT DOCUMENTS

| | | | |
|---|---|---|---|
| 6,556,820 B1 * | 4/2003 | Le et al. | 455/411 |
| 8,180,395 B2 * | 5/2012 | Moran et al. | 455/556.1 |
| 8,565,689 B1 * | 10/2013 | Rubin et al. | 455/67.11 |
| 2005/0026616 A1 * | 2/2005 | Cavalli et al. | 455/436 |
| 2007/0087745 A1 * | 4/2007 | Poyhonen et al. | 455/432.1 |
| 2007/0297439 A1 * | 12/2007 | Ihattula | 370/445 |
| 2008/0003988 A1 * | 1/2008 | Richardson | 455/414.3 |
| 2009/0042578 A1 * | 2/2009 | Rinne et al. | 455/442 |
| 2009/0225689 A1 | 9/2009 | Yu | 370/310.2 |
| 2011/0111753 A1 * | 5/2011 | Vainikka et al. | 455/425 |

FOREIGN PATENT DOCUMENTS

| | | |
|---|---|---|
| WO | WO 97/34429 | 9/1997 |
| WO | WO 02/096032 A2 | 11/2002 |
| WO | WO 2008/061470 | 5/2008 |
| WO | WO 2008/066928 | 6/2008 |

* cited by examiner

*Primary Examiner* — Ganiyu A Hanidu
(74) *Attorney, Agent, or Firm* — Harrington & Smith

(57) ABSTRACT

A method of operating a network element of a wireless communication network is provided, wherein the network element is capable of communicating with a user equipment via at least two different communication technologies. The method includes communicating data between the user equipment and the network element by using a first communication technology and communicating the data between the network element and a further network element by using a second communication technology different from the first communication technology.

11 Claims, 2 Drawing Sheets

RADIO ACCESS TECHNOLOGY MULTIPLEXING

FIELD OF THE INVENTION

The present invention relates to the field of wireless communication networks.

ART BACKGROUND

Known wireless communication networks often provide more than one radio access technology like GSM, UMTS, etc. The different radio access technologies provide different advantages and disadvantages for a possible requested service like a voice call, data streaming, file download, etc., coming from, for example, different spectral efficiencies, latencies, jitter, etc. Further, one trend in radio access technology is to provide multi-standard base stations, i.e. base stations allowing to run two or more radio access technologies in parallel. Further, most current user equipments already provide the possibility to access a wireless communication network via different radio access technologies.

In view of the above-described situation, there exists a need for an improved technique that enables to provide a wireless communication network with improved characteristics.

SUMMARY OF THE INVENTION

This need may be met by the subject-matter according to the independent claims. Advantageous embodiments of the herein disclosed subject-matter are described by the dependent claims.

According to a first aspect of the invention, there is provided a method of operating a network element (partially herein referred to as "first network element") of a wireless communication network, wherein the network element is capable of communicating with a user equipment via at least two different communication technologies. The method according to the first aspect comprises communicating data between the user equipment and the network element by using a first communication technology. Further, the method according to the first aspect comprises communicating the data between a further network element and the first network element by using a second communication technology different from the first communication technology.

The first aspect of the invention is based on the idea that the first network element is introduced in wireless communication network to thereby provide the functionality as described with regard to the first aspect and embodiments thereof. The advantage of introducing such a network element into a wireless communication network is that the communication technology used for communication with the user equipment can be changed without affecting the communication of the network element with the rest of the wireless communication network (e.g. the wireless communication network on a "side" opposite the side to which the user equipment is coupled). According to an embodiment, such a switching between communication technologies is performed during an existing connection, e.g. during a call or during a data transmission. According to a further embodiment, changing (switching) the communication technologies may be performed independently form the actual connection status of the user equipment. In some embodiments, changing the communication technology may be regarded as being in some sense similar to a handover, but without affecting the further network element and the rest of the wireless communication network depending therefrom.

The herein referenced (first) network element may be a physical entity according to some embodiments. According to other embodiments, the herein referenced first network element is a software module providing the above-mentioned functionality.

According to an embodiment, the first communication technology is one of a Global System for Mobile communication (GSM), Universal Mobile Telecommunications System (UMTS), Long Term Evolution (LTE), etc., just to name a few examples. According to a further embodiment, the second communication technology is one of GSM, UMTS, LTE, etc.

According to a further embodiment, at least one of the first communication technology and the second communication technology is a cellular communication technology.

According to a further embodiment, the user equipment is one of a mobile phone, a computer, an extension device pluggable into a computer, etc.

According to a further embodiment, the wireless communication network comprises a radio access network and a core network communicating with the radio access network, wherein the (first) network element is located in the radio access network. According to a further embodiment, the method according to the first aspect comprises determining for the user equipment radio conditions for the at least two different communication technologies. Such determining of the user equipment radio conditions includes determining these radio conditions by the network element itself or receiving these user equipment radio conditions from a further entity of the wireless communication network, e.g. from the user equipment.

According to a further embodiment, the method according to the first aspect comprises selecting one of the at least two different communication technologies as the first communication technology by taking into account the radio conditions for the at least two different communication technologies. This allows for changing the communication technology to the one which provides the better radio conditions, thereby resulting in an overall improved radio condition for the user equipment.

According to a further embodiment of the first aspect, the method further comprises determining a load status for each of the at least two different communication technologies. Such determining of the load status can be performed by the network element itself, in one embodiment. Further, such determining of a load status according to an embodiment of the first aspect includes receiving the load status from a further entity of the wireless communication network.

According to a further embodiment of the first aspect, the method further comprises selecting one of the at least two different communication technologies as the first communication technology by taking into account the load status of the at least two different communication technologies. This allows for efficient switching of the communication technology depending on the actual load status of the at least two different communication technologies. Hence, according to an embodiment, load balancing is achieved by performing the method according to the first aspect.

According to a further embodiment of the first aspect, the method further comprises selecting one of the at least two different communication technologies as the first communication technology by taking into account the actual data transfer capacity of the at least two different communication technologies. The actual data transfer capacity of a communication technology may be determined by taking into account the maximum data transfer capacity of the modulation scheme that is actually used by the communication technology under consideration. It should be noted that some communication technologies may use a predetermined modulation scheme, whereas other communication technologies may use one of two or more different modulation schemes depending e.g. on the actual radio conditions. For example, when a particular communication technology is able to operate with a more efficient modulation scheme (compared to other communication technologies), it may be advantageous to use this particular communication technology even if the load of this communication technology is high. For determining the load status or the data transfer capacity of a communication technology, a respectively configured determination unit or determination entity is provided.

According to a further embodiment of the first aspect, the method further comprises communicating data between a further user equipment and the network element by using a third communication technology different from the first communication technology which is used for communicating data between the first user equipment and the network element. Hence, according to an embodiment, the network element according to the herein disclosed subject-matter allows for multiplexing between different communication technologies.

According to a further embodiment of the first aspect, the method further comprises communicating the data between the user equipment and the network element by simultaneously using a first communication technology and a further communication technology different from the first communication technology. In other words, according to an embodiment, the network element is configured for simultaneously communicating with a single user equipment via two or more different communication technologies. In such a case, the user equipment is correspondingly configured for being capable of such simultaneous communication by using two or more different communication technologies. An advantage of such an embodiment is that the overall throughput can be increased.

According to a further embodiment of the first aspect, the method further comprises receiving from the user equipment a connection request by using the second communication technology, forwarding the connection request to the further network element by using the second communication technology and initiating a connection between the user equipment and the network element via the first communication technology while maintaining communicating with the further network element by the second communication technology. Hence, according to a further embodiment, the connection request from the user equipment is directly forwarded to the network element by using the same communication technology as the one that is used by the user equipment for submitting the connection request. However, according to another embodiment, initiating the connection between the user equipment and the network element is performed directly by using the first communication technology.

According to other embodiments, a connection between the user equipment and the network element is established via the second communication technology before initiating the connection between the user equipment and the network element via the first communication technology.

According to still other embodiments, different handling schemes might be used for initiating a connection between the user equipment and the network element via one of the at least two different communication technologies.

According to a second aspect of the herein disclosed subject-matter, a network element is provided which is capable of communicating with the user equipment via at least two different communication technologies, wherein the network element comprises a first interface for communicating data between the user equipment and the network element. According to an embodiment, the first interface is capable of using a first communication technology of the at least two different communication technologies. Further, the network element according to the second aspect comprises a second interface for communicating data between the further network element and the network element, wherein the second interface is capable of using a second communication technology.

The term interface used herein generally refers to an abstraction that an entity provides of itself to the outside. For example, according to an embodiment, the interface separates the methods of external communication from internal operation, and allows it to be internally modified without affecting the way outside entities interact with it. It may also provide a means of translation between entities which do not speak the same language, such as between a human and a computer, between different entities of a communications network, etc. Embodiments of herein disclosed interfaces require some additional overhead in the communication via the interface, the additional overhead being related e.g. to the specifics or capabilities of the interface.

According to embodiments of the herein disclosed subject matter, an interface may be a physical interface provided by a hardware component. According to other embodiments of the herein disclosed subject matter, an interface may be a software interface of a software component, the software interface providing for communication of the software component with other entities, e.g. other software components or hardware components.

According to an embodiment, the second communication technology is one of the at least two different communication technologies by which the user equipment can communicate with the network element. According to other embodiments, the second communication technology is a further, different, communication technology, wherein the user equipment is not capable of communicating via this second communication technology.

According to a further embodiment of the second aspect, the network element comprises a processing part for transferring data between the first interface and the second interface, thereby allowing the second interface to use a second communication technology different from the first communication technology used by the first interface. Hence, according to another embodiment, the processing part may provide for translation between the first communication technology and the second communication technology.

According to a further embodiment of the second aspect, the network element comprises a decision unit for deciding which of the at least two different communication technologies is used by the first interface.

According to a further embodiment, the network element comprises a determination unit for determining user equipment radio conditions e.g. by measuring or for receiving user equipment radio conditions and providing these radio conditions to the decision unit such that the deciding which of the at least two different communication technologies is used includes taking into account the user equipment radio conditions.

According to another embodiment, the network element comprises a further determination unit for determining, e.g. measuring or receiving an actual load status or data transfer capacity of the at least two communication technologies and for providing the actual load status/data transfer capacity of the at least two communication technologies to the decision unit, thereby allowing deciding which of the at least two different communication technologies is used by taking into account the actual load status of the at least two different communication technologies. This may allow for a more efficient usage of radio resources and better radio conditions for the user equipment.

According to a third aspect of the herein disclosed subject-matter, a transceiver station of a wireless communication network is provided, wherein the transceiver station comprises a network element according to the second aspect or an embodiment thereof. Further, it should be noted that the network element according to the second aspect might be configured for carrying out the method according to the first aspect or an embodiment thereof.

According to an embodiment of the third aspect, the transceiver station further comprises a first radio resource managing unit for managing radio resources of the first communication technology. Further, the transceiver station comprises a second radio resource managing unit for managing radio resources of the second communication technology. According to a further embodiment, the network element is a common radio resource managing unit (a) communicating with the first radio resource managing unit for managing radio resources for communicating the data between the user equipment and the network element using the first communication technology and (b) communicating with the second radio resource managing unit for managing radio resources for communicating data between the user equipment and the network element using the second communication technology.

It should be noted that even for the latter embodiments (as well as for other embodiments), the network element might be introduced into an existing wireless communication network, thereby providing aspects, embodiments and advantages according to the herein disclosed subject-matter without requiring especially adapted user equipment. Further, according to an embodiment, besides introducing the network element into the wireless communication network, no further changes are required to provide an existing wireless communication network with the functionality of some embodiments disclosed herein.

According to a fourth aspect of the herein disclosed subject-matter, a user equipment is provided, the user equipment comprising a first transceiver module for communicating with the network element via a first communication technology and a second transceiver module for communicating with the network element via a second communication technology. Further, the user equipment according to the fourth aspect comprises a controller for operating the first transceiver module and the second transceiver module simultaneously. As already discussed with regard to the first aspect, such an embodiment allows for increased throughput between the user equipment and the network element.

According to a fifth aspect of the herein disclosed subject-matter, a computer program is provided, the computer program being capable of processing a physical object, namely data within the wireless communication network, wherein the computer program, when being executed by a data processor, is adapted for controlling the method as set forth in the first aspect or an embodiment thereof.

In the following, there will be described exemplary embodiments of the subject-matter disclosed herein with reference to a method of operating a network element and a network element itself. It has to be pointed out that of course any combination of features relating to different aspects of the herein disclosed subject-matter is also possible. In particular, some embodiments have been described with reference to apparatus type claims whereas other embodiments have been described with reference to method type claims. However, a person skilled in the art will gather from the above and the following description, the claims and the drawings that, unless otherwise notified, in addition to any combination of features belonging to one aspect also combinations between features relating to different aspects or embodiments, for example even between features of the apparatus type claims and features of the method type claims is considered to be disclosed with this application.

The aspects defined above and further aspects of the present invention are apparent from the examples and embodiments to be described hereinafter and are explained with reference to the drawings.

However, it should be understood that the herein disclosed subject matter is not limited to these exemplary embodiments.

DETAILED DESCRIPTION

Figure 1:
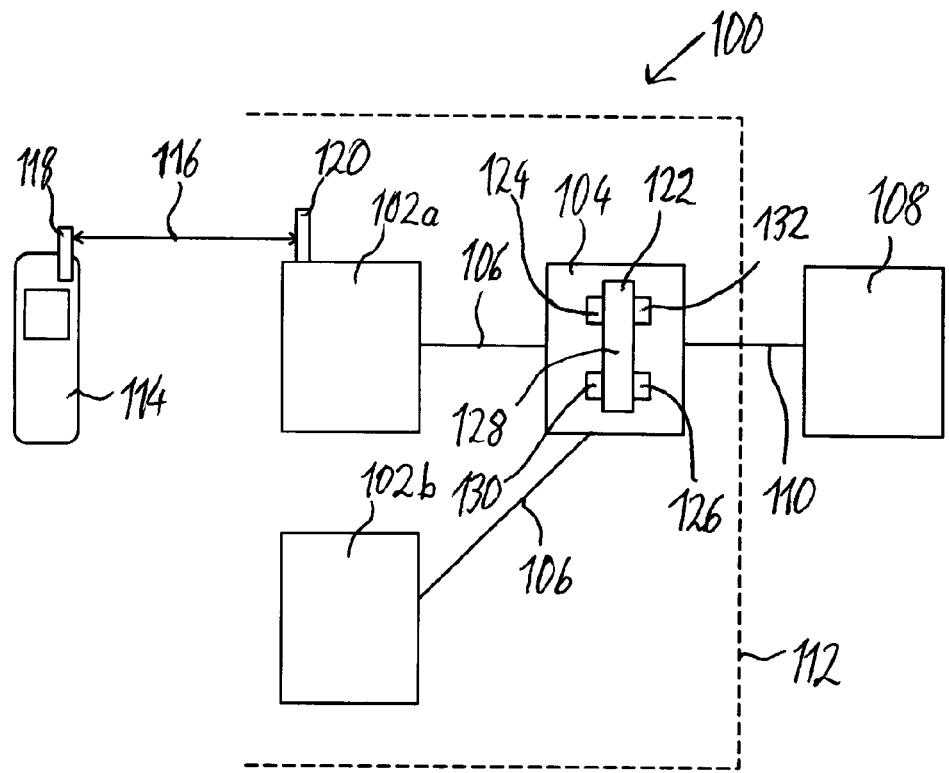
FIG. 1 shows a wireless communication network according to embodiments of the herein disclosed subject-matter.

The illustration in the drawings is schematic. It is noted that in different figures, similar or identical elements are provided with the same reference signs or with reference signs which are different from the corresponding reference signs only within the first digit or an appended character.

A basic idea of aspects of the herein disclosed subject-matter is to provide a network element either in software or in hardware, which is capable of communicating data from and to a user equipment by using a first communication technology while communicating these data to a further network element by using a second communication technology different from the first communication technology. Of course, it should be understood that according to an embodiment, the network element is also capable of communicating with the user equipment via a first communication technology and communicating these data between the network element and the further network element also by the first communication technology.

One trend in radio access technologies is to provide multi-standard base stations, i.e. base stations allowing to run more than one radio access technology like GSM, UMTS, LTE, etc. in parallel. These radio access technologies provide different advantages and disadvantages for the possible requested services like voice call, data streaming, file downloads, etc., resulting for example from different spectral efficiencies, latencies, jitter, etc. The efficiency of modern data communication systems, fixed net or wireless, depend to a very high degree on the multiplexing gain, i.e. on the degree of utilization of available resources through the different statistical behaviour of the individual users.

By accessing the same resource the statistically different behaviour of the users leads to a better average resource usage than can be obtained by a fixed allocation of budgets to the users. However, when having regard to the herein disclosed subject-matter, such multi-standard base stations can be seen as providing fixed budgets to supplied communication technologies or radio access technologies. Hence, embodiments of the herein disclosed subject-matter propose to make the multiplexing gain between the different technologies accessible through fast handover between different communication technologies or radio access technologies. According to embodiments, such inter-technology handovers are performed within a base station or a base transceiver station of a wireless communication network.

In addition to multiplexing gain considerations, from the state of implementation of the different communication technologies or radio access technologies in a given base station it may be advisable to select a specific communication technology or radio access technology for instance to be most cost-efficient, in providing optimal service to the subscriber, or to make most efficient use of a available resources. For example, a network element of the herein disclosed subject-matter may also provide release or vendor-specific parameters allowing fine-tuning in exploiting the given equipment. It should be noted, that known handover between radio access technologies allows switching between these technologies, but, being signaled via the corresponding core networks, has a high latency and requires a high signaling effort.

FIG. 1 shows an exemplary wireless communication network in accordance with embodiments of the herein disclosed subject-matter.

The wireless communication network 100 includes a base station 102a and a base station controller 104. The wireless communication network may include further base stations, one of which is shown in FIG. 1 and which is indicated at 102b. The base stations 102a and 102b communicate with the base station controller 104 via respective interfaces 106. The base station controller 104 communicates with a core network 108 via a respective interface 110. According to an embodiment, the base stations 102a, 102b and the base station controller 104 are part of a radio access network indicated at 112 in FIG. 1.

One or more user equipments 114 may communicate with one or more of the base stations 102a, 102b via an air interface indicated at 116 in FIG. 1. To this end, the user equipment 114 and the respective base station 102a is provided with a respective antenna unit, exemplarily indicated at 118 and 120, respectively, in FIG. 1. In accordance with an embodiment of the herein disclosed subject-matter, a network element 122 is provided, the network being capable of communicating with the user equipment 114 via at least two different communication technologies. To this end, the network element comprises a first interface 124 for communicating data between the user equipment 114 and the network element 122. The first interface 124 is capable of using a first communication technology of the at least two different communication technologies which can be handled by the user equipment.

In this document, communicating data between a first entity and a second entity may include transmitting the data from the first entity to the second entity and/or vice versa. "Data" may be any kind of data, packet data, non-packet data, signaling data, payload, etc.

In accordance with a further embodiment of the herein disclosed subject-matter, the network element 122 comprises a second interface 126 for communicating data between the network element 122 and a further network element, e.g. between the network element 122 and the core network 108, as shown in FIG. 1. Further, the network element 122 comprises a processing part 128 for transferring the data between the first interface 124 and the second interface 126. The processing part 128 allows the usage of a first communication technology by the first interface 124 and a second communication technology by the second interface 126 for transferring data from the user equipment 114 to the further network element 108.

The network element 122 further comprises a third interface 130 for communicating data between the user equipment 114 and the network element 122 via the second communication technology. Further, the network element 122 comprises a fourth interface 132 for communicating data between the network element 122 and the further network element 108 via the first communication technology.

Having regard to FIG. 1, it is apparent that the base stations 102a and 102b may each be a multi-standard base station capable of communicating via at least two different communication technologies, wherein according to other embodiments, the base stations 102a and 102b may be configured for operating with a single communication technology thereby providing radio access via by providing different base stations.

Although the principles of some embodiments of the herein disclosed subject-matter have been described with regard to FIG. 1 by referring to only two different communication technologies, it should be understood that according to other embodiments three or more different communication technologies and respective interfaces may be provided.

Figure 2:
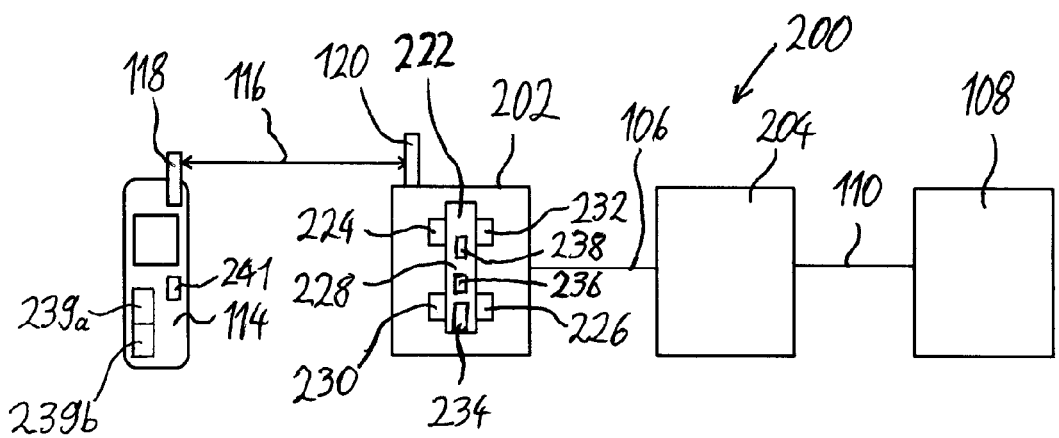
FIG. 2 shows a further wireless communication network according to embodiments of the herein disclosed subject-matter.

FIG. 2 shows a wireless communication network 200 which comprises similar elements as the wireless communication network 100 shown in FIG. 1, wherein similar elements have been provided with the same reference signs and the description of these elements is not repeated here.

Different from the wireless communication network 100 of FIG. 1, the base station 202 of the wireless communication network 200 comprises a network element 222, in accordance with embodiments of the herein disclosed subject-matter. It should be noted that according to other embodiments, which are not shown in FIG. 2, the base station 202 may be connected to two or more base station controllers 204. Further, according to other embodiments, which are not shown in FIG. 2, the base station is directly connected to the core network 108, as is the case e.g. for LTE or WiMAX (Worldwide Interoperability for Microwave Access).

The wireless communication network 200 comprises a base station controller 204 which—according to an embodiment—forms the further network element in the sense of the herein disclosed subject-matter. The network element 222 comprises a first interface 224 for communicating data between the user equipment 114 and the network element 222 via a first communication technology. Further, the network element 222 comprises a second interface 226 for communicating the data between the network element 222 and the further network element 204. In FIG. 2, the further network element 204 is a base station controller in the wireless communication network 200.

Further, the network element 222 comprises a third interface 230 for communicating with the user equipment 114 via the second communication technology and a fourth interface 232 for communicating (data) with the further network element 204 via the first communication technology.

According to an embodiment, in the wireless communication networks shown in FIG. 1 and FIG. 2 all entities except the respective entity 104, 202 which includes the network element 122, 222 may be standard entities which are capable of communicating via the respective communication technologies.

In the wireless communication network 200 of FIG. 2, the base station 202 is a multi-standard base station, as the network element 222 provides for communication via different communication technologies via the same, i.e. a single, base station 202.

Exemplarily shown in FIG. 2 is a first determination unit 234 for determining user equipment radio conditions for the at least two different communication technologies via which the user equipment 114 is capable of communicating with the base station 202. Further, the network element 222 comprises a second determination unit 236 for determining an actual load status and/or data transfer capacity of the at least two communication technologies which are handled via interfaces 224, 230 for communication with the user equipment 114. According to other embodiments, the determination units 234, 236 are not part of the network element 222 but are located in a different entity of the wireless communication network 200.

The network element 222 further comprises a decision unit 238 for deciding which of the at least two different communication technologies is used for communicating with the user equipment.

According to an embodiment shown in FIG. 2 the decision unit 238 is part of the network element 222. However, according to other embodiments, the decision unit is located at a different position and/or within a different entity of the wireless communication network 200.

Depending which of the decision unit 238 and the determination units 236, 234 are present, these units and the processing part 228 of the network element 222 are operatively coupled to provide the respective functions disclosed herein. For example, according to an embodiment, the first determination unit 234, and the second determination unit 236 are operatively coupled to the decision unit 238 for allowing the decision unit 238 to decide which of the at least two different communication technologies is used for communicating with the user equipment 113 by taking into account the radio conditions of each communication technology for the user equipment and for taking into account the load status of the at least two different communication technologies. According to a further embodiment, the decision unit provides a respective decision to the processing part 228 of the network element 222. The processing part 228 effects transferring data between the respective interfaces 224, 226, 230, 232 of the network element, e.g. for transferring data between the first interface 224 and the second interface 226 in response to the decision signal.

Embodiments of the herein disclosed subject-matter provide a functional unit, e.g. the above mentioned decision unit 238, which knows the radio conditions with respect to a particular user equipment of two or more radio access technologies. According to another embodiment, the radio conditions for a user equipment may be known by individual radio resource managers of the involved radio access technologies based on user equipment measurements. According to an embodiment, the network element according to the herein disclosed subject-matter is a common radio resource managing unit which receives radio conditions or load status of two or more radio access technologies from the individual radio resource managing units associated with each of the radio access technologies.

In FIG. 2, the user equipment 114 comprises a first transceiver module 239a for communicating with the network element 222 via the first communication technology, i.e. via the first interface 224 of the network element 222. Further, the user equipment 114 comprises a second transceiver module 239b for communicating with the network element 222 via a second communication technology, i.e. via the third interface 230 of the network element. Further, the user equipment 114 comprises a controller 241 for operating said first transceiver module 239a and said second transceiver module 239b simultaneously.

Figure 3:
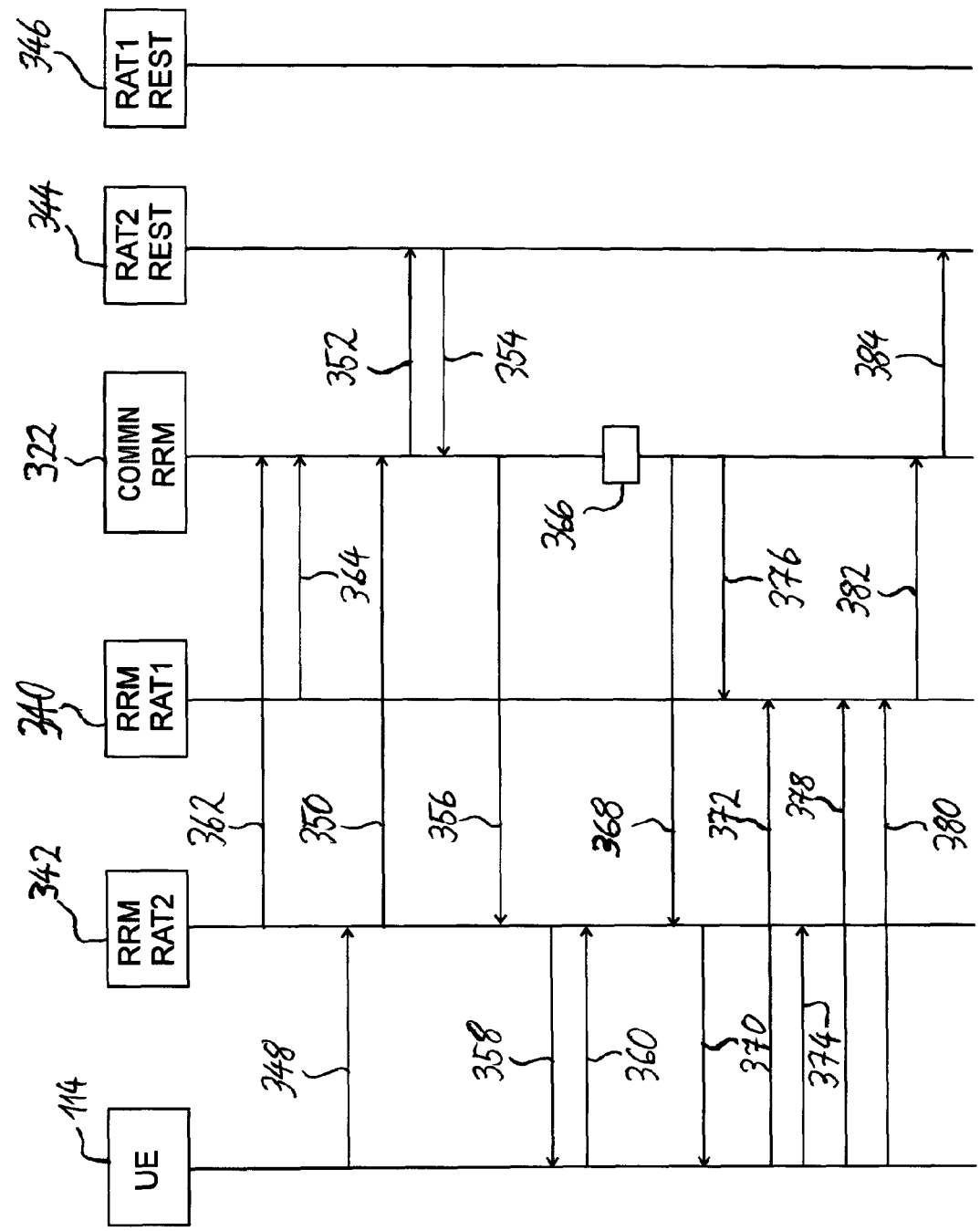
FIG. 3 shows a connection scenario according to embodiments of the herein disclosed subject-matter.

FIG. 3 shows an exemplary scenario for establishing a connection of a user equipment 114 to a wireless communication network. The wireless communication network comprises a first radio resource managing unit 340 for a first radio access technology RAT1. Further the wireless communication network comprises a second radio resource managing unit 342 for a second radio access technology RAT2. Further, the wireless communication network comprises as a network element in the sense of the herein disclosed subject-matter a common radio resource managing unit (COMN RRM) 322. Further, the wireless communication network comprises a further network element 344 of the second radio access technology and a further network element 346 of the first radio access technology.

According to an exemplary embodiment, first, the user equipment 114 submits a connection setup request 348 to the radio resource managing unit 342 by using the second radio access technology. The radio resource managing unit 342 forwards the connection setup request in a respective message 350 to the common radio resource managing unit 322. The common radio resource managing unit 322 forwards the connection setup request to the further network element 344 belonging to the second radio access network which provides the second radio access technology in a respective message 352. The further network element 344 of the second radio access network provides a respective connection setup response message 354 to the common radio resource managing unit 322. The common radio resource managing unit 322 forwards the connection setup response in a respective message 356 to the radio resource managing unit 342 of the second radio access network. The radio resource managing unit 342 forwards the connection setup response in a respective message 358 to the user equipment 114. In response hereto, the user equipment 114 starts a data transfer to the second radio access network indicated at 360 in FIG. 3. In FIG. 3, the data transfer 360 is shown only between the user equipment and the radio resource managing unit 342 of the second radio access network. However, it should be understood that, although not shown in FIG. 3, the data is transferred form the radio resource managing unit 342 via the common radio resource managing unit 322 to the further network element 344, and, finally to the core network.

According to an embodiment, the connection setup request and/or the connection setup response may indicate a certain quality of service (QoS).

The common radio resource managing unit 322 receives a load state 362 from the radio resource managing unit 342 of the second radio access network. Further, the common radio resource managing unit 322 receives a load state 364 from the radio resource managing unit 340 of the first radio access network. Depending on the load state of the two available radio access technologies, the common radio resource managing unit 322 may decide to handover the connection with the user equipment 114 from the second radio access technology 342 to the first radio access technology which is managed by the first radio resource managing unit 340. This handover decision is indicated at 366 in FIG. 3. Following this handover decision 366, the common radio resource managing unit 322 sends a handover request to the radio resource managing unit 342 of the second radio access technology in a respective message 368. The radio resource managing unit 342 forwards the handover request to the first radio access technology to the user equipment 114 in a respective message 370. In response hereto, the user equipment 114 performs a connection setup to the first radio access technology by sending a respective message 372 to the radio resource managing unit 340 of the first radio access technology. The connection setup initiated with the message 372 may be a simplified connection setup which requires no authentication, no access control, etc. Further, the user equipment sends a connection release request to the radio resource managing unit 342 of the second radio access technology in respective message 374. The common radio resource managing unit 322 transmits a handover request for handover from the second radio access technology to the first radio access technology to the radio resource managing unit 340 of the first radio access technology in a respective message 376.

In response to the above-mentioned messages, the user equipment 114 starts a data transfer to the first radio access network via the first radio access technology, indicated at 378 in FIG. 3. Similar to the case of the data transfer 360, the data transfer 378 is shown only between the user equipment and the radio resource managing unit 340 of the first radio access network. However, it should be understood that, although not shown in FIG. 3, the data is transferred form the radio resource managing unit 340 via the common radio resource managing unit 322 to the further network element 344 of the second radio access network, and, finally to the core network.

At the end of data transmission, the user equipment 114 transmits a connection release request 380 to the radio resource managing unit 340 of the first radio access technology. In response hereto, the radio resource managing unit 340 forwards the connection release request to the common radio resource managing unit 322 in a respective message 382. In response hereto, the common radio resource managing unit 322 forwards, in a respective message 384, a connection release request to the further network element 344 of the second radio access technology and hence to the core network, to which the further network element 344 is coupled. The connection release request message 384 to the further network element 344 may include accounting information, in one embodiment.

For example, the accounting information may include accounting information of the connections to both, the first radio access network operating with the first radio access technology and the second radio access network operating with the second radio access technology. Hence, the network element according to the herein disclosed subject-matter may collect accounting information for all radio access technologies used by a user equipment in a session.

Having regard to FIG. 3, it is noted that the further network elements 344, 346 may be representative for the remaining network parts like, e.g., radio network controller RNC, UMTS Mobile Switching Centre UMSC, gateway GRPS Support Node GTSN, serving GPRS Support Node SGSN, Mobility Management Entity MME, and UMTS Provider Edge UPE. It should be noted, that although the aforementioned entities may be regarded as relating to high speed packet access UMTS entities (HSPA) and Long-Term Evolution (LTE), that this in no way limiting and only provided as an example.

As used herein, reference to a computer program is intended to be equivalent to a reference to a program element and/or a computer-readable medium containing instruction for controlling a computer system to coordinate the performance of methods according to the herein disclosed subject-matter. The computer program may be implemented as computer-readable instruction code in any suitable programming language, such as, for example, JAVA, C++, and may be stored on a computer-readable medium (removable disk, volatile or non-volatile memory, embedded memory/processor, etc.). The instruction code may be operable to program a computer or any other programmable device to carry out the intended functions according to one or more of the herein disclosed embodiments. The computer program may be available from a network, such as the World Wide Web, from which it may be downloaded.

The herein disclosed subject-matter, or embodiments or examples thereof may be realized by means of a computer program respectively software. However, the invention may also be realized by means of one or more specific electronic circuits respectively hardware. Furthermore, the invention may also be realized in a hybrid form, i.e. in a combination of software modules and hardware modules.

According to embodiments of the herein disclosed subject-matter, any component of the wireless communication system, e.g. the network element and associated units may be provided in the form of respective computer program products which enable a processor to provide the functionality of the respective elements as disclosed herein.

It should be noted that the term "comprising" does not exclude other elements or steps and that "a" or "an" does not exclude a plurality. Also elements described in association with different embodiments may be combined. It should also be noted that reference signs in the claims should not be construed as limiting the scope of the claims.

In order to recapitulate the above-described embodiments of the herein disclosed subject-matter one can state:

A method of operating a network element of a wireless communication network is provided, wherein the network element is capable of communicating with a user equipment via at least two different communication technologies. The method comprises communicating data between the user equipment and the network element by using a first communication technology and communicating the data between the network element and a further network element by using a second communication technology different from the first communication technology.

According to embodiments of the herein disclosed subject-matter, an intra base transceiver station inter radio access technology handover controlled by a new common base transceiver station internal radio resource managing function is proposed. The common radio resource managing function or unit is transparent to the involved remaining network parts like RNC, UMSC, GTSN, SGSN, MME and UPE, when considering HSPA and LTE exemplarily.

An incoming service request that is always originating from a specific radio access technology—like e.g. HSPA streaming service—is routed to the common radio resource managing unit. This service request involves user equipment capabilities, in particular supported radio access technologies and the requested service, in particular the quality of service.

According to an embodiment, the call is established in the originating radio access technology.

According to an embodiment, switching between supported radio access technologies is provided as follows: Known in the base station is the load status of the modules that are run with the supported radio access technologies, the supported subset of radio access technology features and the general advantages and disadvantages of the radio access technologies in comparison to each other. Additionally, operator preferences may be configured. Based on this knowledge, a proposed common radio resource managing unit can decide what radio access technology is preferred to support the given service request. Now, transparently for the originating radio access technology system outside of the base transceiver station, in the given example UMTS, the common radio resource managing unit may switch two or more efficient radio access technology, in this example LTE.

As this happens BTS internally (according to an embodiment), the switching times can be kept in a low millisecond range.

However, the herein disclosed subject-matter is not limited to one switching process right after the initial call setup but the common radio resource managing unit may exploit the full possible multiplexing gain between the supported radio access technologies by assigning each user equipment (supporting the at least two radio access technologies) to the most favourable from the operator perspective.

According to a further embodiment which relates to improving the maximal throughput by simultaneous sending and receiving in LTE and HSPA: In order to increase the maximal throughput beyond the maximal values of the supported radio access technologies, a second radio connection via LTE could be added to the already existing HSPA connection in the above example or vice versa. The core network connection would remain that of the initial call setup whereas sending and receiving is done simultaneously in LTE and HSPA (these two technologies being given only by example).

According to embodiments of the herein disclosed subject-matter, multiplexing between different radio access technologies is allowed and supported. This increases the resource usage and allows to support more user equipments at a time. The fast switching times and a simple implementation allow seamless transitions.

According to other embodiments there are provided some modifications on the signaling of the call release to the core network providing necessary accounting information like number of bytes transferred in each of the at least two radio access technologies (e.g. the number of bytes transferred in first radio access technology and the number of bytes transfer in the second radio access technology).

In particular in cases where battery consumption is not an issue, like for example, data cards, embodiments of the herein disclosed subject-matter lead to a higher average data throughput. The subscriber perception may hence increase and the actual data rates may be closer to the maximally possible data rates of the utilized technology.

The parallel usage of the two radio links of two radio access technologies according to an embodiment allows to provide to the subscriber maximal data rates that are the sum and consequently much higher than the maximal throughput of the individual radio access technologies.

List of Reference Signs:
- 100, 200 wireless communication network
- 102a, 102b, 202 base station
- 104, 204 base station controller
- 106 interface
- 108, 208 core network
- 110 interface
- 112 radio access network
- 114 user equipment
- 116 air interface
- 118 antenna unit
- 120 antenna unit
- 122, 222, 322 (first) network element
- 124, 224 first interface
- 126, 226 second interface
- 128 processing part
- 130 third interface
- 132 fourth interface
- 234, 236 determination unit
- 238 decision unit
- 340 first radio resource managing unit
- 342 second radio resource managing unit
- 344, 346 further network element
- 348, 350, 352 connection setup request message
- 354, 356, 358 connection setup response message
- 360, 378 data transfer
- 362, 364 load state information
- 366 handover decision
- 368, 370 handover request message
- 372 connection setup message
- 374 connection release request
- 376 handover request message
- 380, 382, 384 connection release request message

The invention claimed is:

1. A method comprising:
communicating data between a network element, capable of communicating with a user equipment via at least two different communication technologies, and the user equipment by using a first communication technology of the at least two different communication technologies;
determining radio conditions, of the at least two different communication technologies between the network element and the user equipment, by a multi radio access technology radio resource management function transparent to a plurality of further network elements of the at least two different communication technologies;
in response to said determining, selecting by the multi radio access technology radio resource management function to use a second communication technology of the at least two different communication technologies based on said radio conditions, wherein said second communications technology is different from the first communication technology; and
determining a load status of each of said at least two different communication technologies;
communicating said data between a further network element of the plurality of further network elements and said network element by using a second the second communication technology, wherein
communicating said data between said user equipment and said network element by simultaneously using a first communication technology and a further communication technology different from said first communication technology.

2. The method of claim 1, further comprising:
selecting one of said at least two different communication technologies as said first communication technology by taking into account said load status of said at least two different communication technologies.

3. Method according to claim 1, further comprising:
communicating data between a further user equipment and said network element by using a third communication technology different from said first technology.

4. Method according to claim 1, further comprising:
receiving from said user equipment a connection request by using said second communication technology;
forwarding said connection request to said further network element by using said second communication technology;
initiating a connection between said user equipment and said network element via said first communication technology while maintaining communicating with said further network element by using said second communication technology.

5. Method according to claim 4, further comprising:
establishing a connection between said user equipment and said network element via said second communication technology before initiating said connection between said user equipment and said network element via said first communication technology.

6. A network element comprising:
a first interface for communicating data between a user equipment and said network element, wherein said network element is capable of communicating with the user equipment via at least two different communication technologies, and wherein said first interface is capable of using a first communication technology of said at least two different communication technologies;
a second interface for communicating said data between a further network element of a plurality of further network elements of the at least two different communication technologies and said network element, wherein said second interface is capable of using a second communication technology;
a multi radio access technology radio resource management function, transparent to the plurality of further network elements of the at least two different communication technologies, for determining radio conditions of the at least two different communication technologies between the network element and the user equipment, and deciding for said first interface to use a second communication technology of the at least two different communication technologies based on said radio conditions, wherein said second communications technology is different from the first communication technology; and
determining a load status of each of said at least two different communication technologies;
a processing part for transferring said data between said first interface and said second interface, thereby allowing said second interface to use a second communication technology, wherein
communicating said data between said user equipment and said network element by simultaneously using a first communication technology and a further communication technology different from said first communication technology.

7. A transceiver station comprising:
a first interface for communicating data between a user equipment and said network element, wherein said network element is capable of communicating with the user equipment via at least two different communication technologies, and wherein said first interface is capable of using a first communication technology of said at least two different communication technologies;
a second interface for communicating said data between a further network element of a plurality of further network elements of the at least two different communication technologies and said network element, wherein said second interface is capable of using a second communication technology;
a multi radio access technology radio resource management function, transparent to the plurality of further network elements of the at least two different communication technologies, for determining radio conditions of the at least two different communication technologies between the network element and the user equipment, and deciding for said first interface to use a second communication technology of the at least two different communication technologies based on said radio conditions, wherein said second communications technology is different from the first communication technology; and
determining a load status of each of said at least two different communication technologies;
a processing part for transferring said data between said first interface and said second interface, thereby allowing said second interface to use a second communication technology, wherein
communicating said data between said user equipment and said network element by simultaneously using a first communication technology and a further communication technology different from said first communication technology.

8. Transceiver station according to claim 7, further comprising:
a first radio resource managing unit for managing radio resources of said first communication technology;
a second radio resource managing unit for managing radio resources of said second communication technology;
wherein said network element is a common radio resource managing unit
communicating with said first radio resource managing unit for managing radio resources for communicating data between said user equipment and said network element using said first communication technology and
communicating with said second radio resource managing unit for managing radio resources for communicating data between said user equipment and said network element using said second communication technology.

9. User equipment comprising:
a first transceiver module for communicating with a network element via a first communication technology;
a second transceiver module for communicating with said network element via a second communication technology;
and a controller for operating said first transceiver module and said second transceiver module simultaneously.

10. A computer program product embodied on a non-transitory computer-readable medium in which a computer program is stored that, when being executed by a computer, is configured to provide instructions to control or carry out or control the following:
communicating data between a network element, capable of communicating with a user equipment via at least two different communication technologies, and the user equipment by using a first communication technology of the at least two different communication technologies;
determining radio conditions, of the at least two different communication technologies between the network element and the user equipment, by a multi radio access technology radio resource management function transparent to a plurality of further network elements of the at least two different communication technologies;
in response to said determining, selecting by the multi radio access technology radio resource management function to use a second communication technology of the at least two different communication technologies based on said radio conditions, wherein said second communications technology is different from the first communication technology; and
determining a load status of each of said at least two different communication technologies;
communicating said data between a further network element of the plurality of further network elements and said network element by using the second communication technology, wherein
communicating said data between said user equipment and said network element by simultaneously using a first communication technology and a further communication technology different from said first communication technology.

11. An apparatus comprising:
at least one processor and at least one memory including computer program code, wherein the at least one memory and the computer code are configured, with the at least one processor, to cause the apparatus to at least perform the following:
communicating data between a network element, capable of communicating with a user equipment via at least two different communication technologies, and the user equipment by using a first communication technology of the at least two different communication technologies;
determining radio conditions, of the at least two different communication technologies between the network element and the user equipment, by a multi radio access technology radio resource management function transparent to a plurality of further network elements of the at least two different communication technologies;
in response to said determining, selecting by the multi radio access technology radio resource management function to use a second communication technology of the at least two different communication technologies based on said radio conditions, wherein said second communications technology is different from the first communication technology; and
determining a load status of each of said at least two different communication technologies;
communicating said data between a further network element of the plurality of further network elements and said network element by using a second the second communication technology, wherein
communicating said data between said user equipment and said network element by simultaneously using a first communication technology and a further communication technology different from said first communication technology.

* * * * *

UNITED STATES PATENT AND TRADEMARK OFFICE
CERTIFICATE OF CORRECTION

| | | |
|---|---|---|
| PATENT NO. | : 9,020,507 B2 | Page 1 of 1 |
| APPLICATION NO. | : 13/262975 | |
| DATED | : April 28, 2015 | |
| INVENTOR(S) | : Warken et al. | |

It is certified that error appears in the above-identified patent and that said Letters Patent is hereby corrected as shown below:

In the Claims

Claim 3, col. 14, line 47 "Method according to claim" should be deleted and --The method of claim-- should be inserted.

Claim 4, col. 14, line 51 "Method according to claim" should be deleted and --The method of claim-- should be inserted.

Claim 5, col. 14, line 62 "Method according to claim" should be deleted and --The method of claim-- should be inserted.

Claim 9, col. 16, line 26 "User equipment comprising:" should be deleted and --The method of claim 1, wherein the user equipment comprises:-- should be inserted.

Signed and Sealed this
Twenty-third Day of June, 2015

Michelle K. Lee
*Director of the United States Patent and Trademark Office*